(12) United States Patent
Fischer et al.

(10) Patent No.: US 8,013,716 B2
(45) Date of Patent: Sep. 6, 2011

(54) METHOD FOR WIRELESS DATA TRANSMISSION

(75) Inventors: Martin Fischer, Pfedelbach (DE); Ulrich Friedrich, Ellhofen (DE); Dirk Ziebertz, Eberstadt (DE)

(73) Assignee: Atmel Corporation, San Jose, CA (US)

( * ) Notice: Subject to any disclaimer, the term of this patent is extended or adjusted under 35 U.S.C. 154(b) by 867 days.

(21) Appl. No.: 11/298,697

(22) Filed: Dec. 12, 2005

(65) Prior Publication Data

US 2006/0125598 A1 Jun. 15, 2006

(30) Foreign Application Priority Data

Dec. 13, 2004 (DE) .......................... 10 2004 062 364

(51) Int. Cl.
*H04Q 5/22* (2006.01)
(52) U.S. Cl. .................... 340/10.41; 340/10.1; 340/10.2
(58) Field of Classification Search ................. 340/10.4, 340/10.41, 10.42, 10.1, 10.2
See application file for complete search history.

(56) References Cited

U.S. PATENT DOCUMENTS

| | | | | |
|---|---|---|---|---|
| 5,028,918 A * | 7/1991 | Giles et al. | ................ | 340/10.51 |
| 5,218,343 A * | 6/1993 | Stobbe et al. | ............... | 340/573.4 |
| 5,517,194 A * | 5/1996 | Carroll et al. | ............... | 340/10.34 |
| 5,583,819 A * | 12/1996 | Roesner et al. | ............ | 340/10.51 |
| 5,621,412 A * | 4/1997 | Sharpe et al. | ............... | 340/10.33 |
| 5,649,296 A * | 7/1997 | MacLellan et al. | ............. | 455/39 |
| 5,912,632 A * | 6/1999 | Dieska et al. | ................ | 340/10.5 |
| 5,986,570 A * | 11/1999 | Black et al. | .................. | 340/10.2 |
| 6,046,683 A * | 4/2000 | Pidwerbetsky et al. | ....... | 340/10.4 |
| 6,107,910 A * | 8/2000 | Nysen | ........................... | 340/10.1 |
| 6,147,605 A * | 11/2000 | Vega et al. | .................. | 340/572.7 |
| 6,288,629 B1 * | 9/2001 | Cofino et al. | ................ | 340/10.1 |
| 6,362,738 B1 * | 3/2002 | Vega | ........................... | 340/572.1 |
| 6,463,039 B1 * | 10/2002 | Ricci et al. | ..................... | 370/277 |
| 6,531,957 B1 * | 3/2003 | Nysen | ........................... | 340/10.1 |
| 6,683,527 B1 * | 1/2004 | Greenwood | ................ | 340/5.61 |
| 6,720,866 B1 * | 4/2004 | Sorrells et al. | ............... | 340/10.4 |
| 6,765,484 B2 * | 7/2004 | Eagleson et al. | ............. | 340/505 |
| 6,822,582 B2 * | 11/2004 | Voeller et al. | ................. | 340/933 |
| 6,963,270 B1 * | 11/2005 | Gallagher, III et al. | ...... | 340/10.2 |
| 7,049,936 B2 * | 5/2006 | Wuidart | ....................... | 340/10.4 |
| 7,436,308 B2 * | 10/2008 | Sundstrom et al. | ........ | 340/572.4 |
| 2002/0024421 A1 * | 2/2002 | Kang | ........................... | 340/10.2 |
| 2002/0180587 A1 * | 12/2002 | Stegmaier et al. | ........... | 340/10.1 |
| 2004/0217865 A1 | 11/2004 | Turner | | |

(Continued)

FOREIGN PATENT DOCUMENTS

EP 0 677 815 B1 10/1995

(Continued)

OTHER PUBLICATIONS

Pete Sorrells, Passive RFID Basics, 1998, Microchip Technology Inc., ww1.microchip.com/downloads/en/AppNotes/00680b.pdf.*

(Continued)

*Primary Examiner* — Daniel Wu
*Assistant Examiner* — Rufus Point
(74) *Attorney, Agent, or Firm* — Baker Botts L.L.P.

(57) ABSTRACT

A method and apparatus for wireless data transmission is provided between a base station and a backscatter-based transponder, in which the transponder generates a presence signal after initialization or at predetermined time intervals, independent of data transmitted by the base station. The presence signal is generated by phase modulation and backscattering of a carrier signal transmitted by the base station.

12 Claims, 1 Drawing Sheet

U.S. PATENT DOCUMENTS

| | | | |
|---|---|---|---|
| 2004/0246102 A1* | 12/2004 | Jaakkola et al. | 340/10.4 |
| 2005/0099269 A1* | 5/2005 | Diorio et al. | 340/10.51 |
| 2006/0132287 A1* | 6/2006 | Phipps et al. | 340/10.1 |

FOREIGN PATENT DOCUMENTS

| | | |
|---|---|---|
| EP | 1 467 314 A1 | 4/2006 |
| FR | 2 790 154 A1 | 8/2000 |
| WO | WO-01/06401 A1 | 1/2001 |

OTHER PUBLICATIONS

WJ Communications Inc., Radio Frequency Identification: A brief Introduction, 2004,WJ Communications Inc., http://www.triquint.com/docs/RFID_Docs/RFID_primer.pdf.*

Klaus Finkenzeller, "RFID Handbook,2nd Edition," Wiley 2003, Chapter 3.2.1.2, Load modulation with subcarrier, pp. 42-47.

* cited by examiner

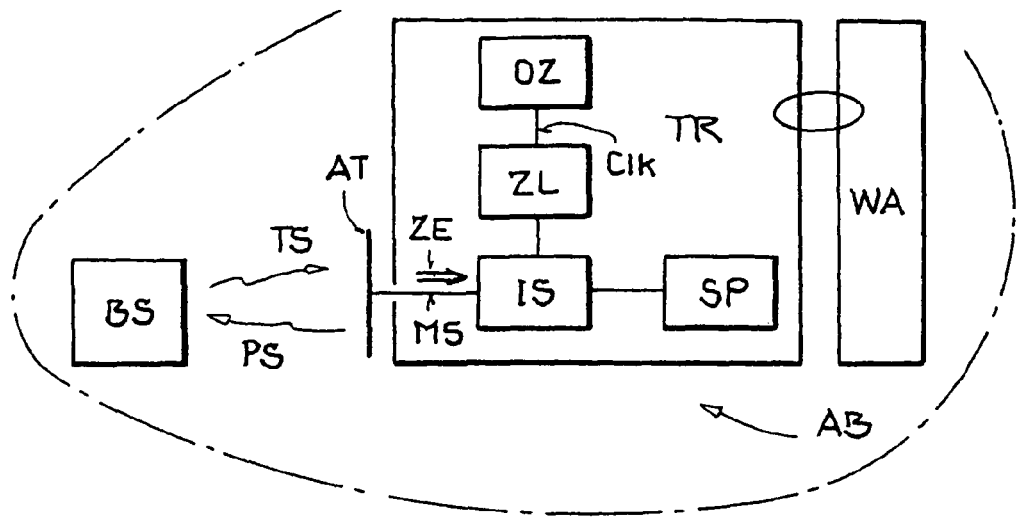
FIG.1
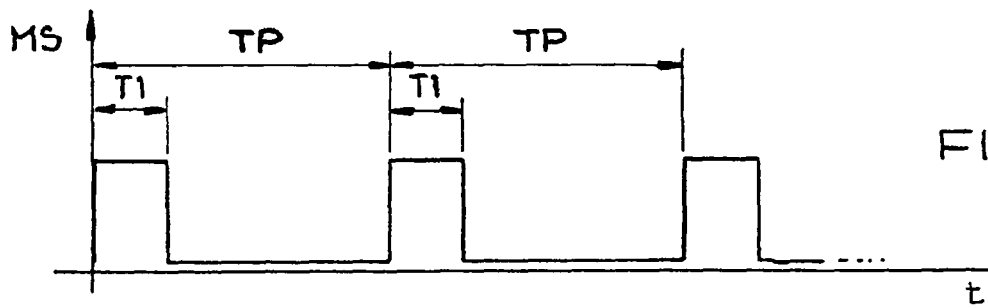
FIG.2
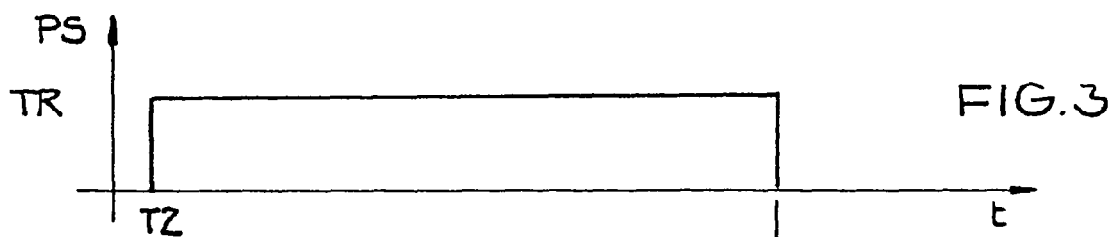
FIG.3
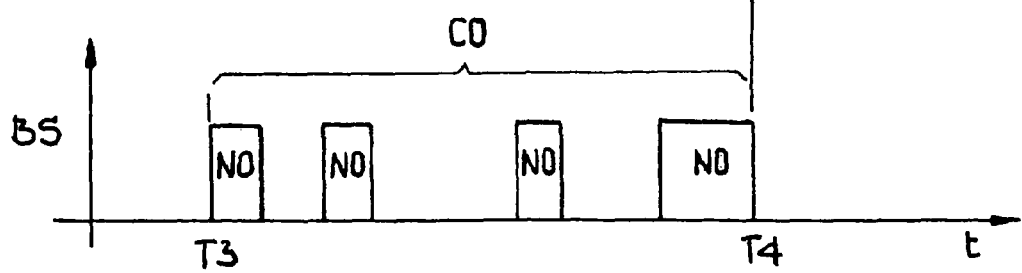

METHOD FOR WIRELESS DATA TRANSMISSION

This nonprovisional application claims priority under 35 U.S.C. §119(a) on German Patent Application No. DE 102004062364.3, which was filed in Germany on Dec. 13, 2004, and which is herein incorporated by reference.

BACKGROUND OF THE INVENTION

1. Field of the Invention

The present invention relates to a method for wireless data transmission between a base station and a transponder, for example, a backscatter-based transponder, in which the transponder generates a presence signal after initialization or at prescribable time intervals, independent of data transmitted by the base station.

2. Description of the Background Art

Transponders are used in radio frequency identification (RFID) systems. In this case, data are transmitted bidirectionally in a wireless manner between one or more base stations or readers and one or more transponders. Sensors, for example, for temperature measurement, can also be integrated into the transponder. Such transponders are also called remote sensors.

Transponders or their transmitting and receiving devices typically do not have an active transmitter for data transmission to the base station. Such inactive systems are called passive systems, when they do not have their own power supply, and semipassive systems, when they have their own power supply. Passive transponders draw the operating energy or operating power necessary for their supply from the electromagnetic field emitted by the base station.

For data transmission from a transponder to a base station with UHF or microwaves in the far field of the base station, as a rule, so-called backscatter coupling is employed. To that end, the base station emits electromagnetic carrier waves or a carrier signal, which is modulated and reflected by the transmitting and receiving device of the transponder by a subcarrier modulation process in accordance with the data to be transmitted to the base station. Amplitude modulation and phase modulation are the typical modulation processes for this purpose.

Data transmission is normally based on the so-called reader-talks-first principle, in which data transmission, also that from the transponder to the base station, is initiated by the base station or the reader. To that end, the base station typically sends data or a command to the transponder, which transmits its data subsequent thereto or overlapping to the base station.

Recently, transponders have also been used in electronic product security systems or electronic article surveillance (EAS) systems. Transponder-based EAS systems for this purpose typically comprise transponders, which are connected to the articles to be secured, and one or more base stations. If the article and thereby the transponder are brought into the transmission range or response range of a base station, it is detected by the base station and accordingly evaluated, for example, by the generation of an alarm signal.

To enable the most delay-free detection possible of a transponder by a base station, EAS functions of said type are based on the so-called tag-talks-first principle. The transponder or the tag hereby after initialization or at prescribable time intervals, independent of the base station, generates a presence signal, which is detectable by the base station, as soon as the transponder enters the transmission range or response range of the base station.

If transponders, which are used in EAS systems and generate a presence signal according to the tag-talks-first principle, are to be accessed according to the reader-talks-first principle, for example, to program them, it is necessary that the transponder can receive data from the base station, while it transmits the presence signal.

Data transmission from the base station to a transponder typically occurs with the use of amplitude modulation of the carrier signal transmitted by the base station in the form of successive field gaps or field attenuations of the carrier signal, which are also called notches. Notches of said type are detected in the transponder by using receiver signal strength indicator (RSSI) circuits.

If the presence signal of the transponder is generated by amplitude modulation and backscattering of the carrier signal by the transponder, the real part of an input impedance of the transponder is changed. In this regard, the modulation index is typically relatively large to achieve accordingly large signal-noise ratios of the backscattered signal. The change in the real part of the input impedance leads to a match or mismatch of the input impedance of the transponder in regard to an impedance of a transponder antenna, as a result of which the reflection or receiving properties of the transponder antenna change and thereby more or less power is reflected or received by the transponder or its antenna. These fluctuations, caused by the transponder itself, in the amplitude of the received carrier signal, however, can be differentiated only with considerable effort from the notch signals generated by the base station, which also result in a change in the amplitude of the received carrier signal. This applies in particular when the field attenuation for notch generation is to be kept low in order to increase the transmission range. Expensive input filters in the transponder are then necessary for the differentiation. To achieve differentiation by a filter, in addition the sidebands of the received and backscattered signal must be relatively far apart. Often, this cannot be realized because otherwise the relevant standards would be violated.

SUMMARY OF THE INVENTION

It is therefore an object of the present invention to provide a method for wireless transmission, which is simple and economical to implement and in which the transponders provide an EAS functionality according to the tag-talks-first principle and data reception by the transponders is possible while the transponders are transmitting a presence signal.

According to the invention, the presence signal is generated by phase modulation and backscattering of a carrier signal transmitted by the base station. Based on the phase modulation, the amplitude of the backscattered signal or the signal received at the transponder is substantially constant, so that no notches are detected in the transponder RSSI circuit due to the generation of the presence signal by the transponder. Only when the base station actually generates notch signals for data transmission are these also detected in the transponder, although the transponder is perhaps simultaneously transmitting a presence signal. In this way, a transponder can be, for example, written or programmed during an active EAS function. A circuit arrangement and a method for generating a phase modulation are presented, for example, in the German Patent Application 10325396.3, which corresponds to U.S. Publication No. 2004257220, the contents of which are hereby incorporated by reference.

In a further embodiment of the method, the transponder is supplied with operating power exclusively by the carrier signal. In an advantageous embodiment, the transponder is initialized when the operating power is sufficient for supplying the transponder. This enables an economical realization of an EAS system, because passive transponders of this type require no battery for their energy supply. Furthermore, it is assured that the transponders generate a presence signal as soon as they enter the transmission range of a base station; i.e., the signal received from the base station is sufficient for the supply.

In a further embodiment, the presence signal can be generated by modulation of the carrier signal with a subcarrier. The modulation of the carrier signal with a subcarrier is described, for example, in the handbook by Klaus Finkenzeller, RFID-Handbuch (RFID Handbook), $3^{rd}$ ed., HANSER, 2002, which is published in English by John Wiley & Sons; see particularly Chapter 3.2.1.2.2 Load Modulation with Auxiliary Carriers, which is incorporated herein by reference. The modulation of the carrier signal with a subcarrier enables a simplified evaluation of the backscattered signal in the base station, because the signal, backscattered much more weakly in comparison with the carrier signal, is shifted to the frequency range in sidebands and thereby can be separated from the carrier signal by suitable filters in the base station.

In yet a further embodiment, the presence signal can contain a transponder identification. In this way, the base station can not only detect that a transponder is located within its response range, but moreover, depending on the transponder identification, can take suitable measures, for example, suppress an alarm at certain values of the transponder identification or selectively address the transponder based on the transponder identification, without a selection process or anticollision process having to be performed beforehand. The parameters necessary for data transmission, for example, the durations necessary for coding the bit priorities, can hereby be stored in a transponder-internal memory and/or be set by the base station with use of a configuration command.

In another embodiment, a configuration command transmitted by the base station and/or a transponder-internal memory can contain one or more parameters for setting the presence signal. This makes it possible, for example, that the spectra brought about by the presence signal(s) do not collide with spectra of other RFID applications. If the presence signal is set with the use of a configuration command transmitted by the base station, the base station can set the spectra of the EAS application dynamically, depending on the previously found ambient conditions. Further, a frequency and/or a pulse duty factor of a modulation signal, with which the carrier signal is modulated, can be set by the parameter(s). Herewith, almost any spectra of the presence signal can be set. The frequency and/or pulse duty factor can be derived from a transponder-internal oscillator clock. Here, for example, a counter can be operated with the transponder-internal oscillator clock, whereby a modulation state is switched, when the counter reading reaches the value of a parameter used to set the presence signal. Different pulse duty factors or pulse/pause ratios and thereby different spectra can be set by the use of two parameter values, which cause a switching of the modulation state when the counter reading reaches the value of the relevant parameter.

In a further embodiment, the generation of the presence signal can be released or suppressed by the parameter(s). In this way, the EAS functionality of the transponder can be activated or deactivated depending on whether this is necessary.

The transponder can end the transmission of the presence signal, when a prescribable maximum time has elapsed and/or the transponder receives a command. After a certain time, the probability is high that the base station has detected the presence signal transmitted by the transponder. Hence, it is appropriate for the transponder to adjust the transmission of the signal, so that other transponders, which enter the transmission range of the base station, are detectable by the base station. When the base station has detected a transponder, it can also switch the transponder to "mute" with the use of a command to be able to detect other transponders.

The frequency of the carrier signal can be within the UHF frequency range.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 is an EAS system with a base station and an article to be secured, to which a transponder is affixed;

FIG. 2 is a diagram of the time course of a modulation signal for modulating a carrier signal transmitted by the base station; and FIG. 3 is a diagram of the time course of a presence signal transmitted by the transponder and a command transmitted by the base station.

DETAILED DESCRIPTION

FIG. 1 shows an EAS system with a base station BS, an article WA to be secured, and a passive, backscatter-based transponder TR, which is affixed to the article WA and can be secured or integrated in such a way that, for example, it cannot be removed from the article by unauthorized persons. Also, the base station BS can be a radio telephony device, such as a mobile telephone.

The transponder TR comprises a memory SP, an oscillator OZ, a counter ZL, an impedance control device IS, and an antenna AT.

The base station BS can continuously emit a carrier signal TS in the UHF frequency range. When the article WA to be secured and thereby the transponder TR are brought into a response range AB of the base station, the power drawn from the carrier signal TS is sufficient to provide the transponder TR with operating power. The transponder TR performs a power-on-reset (POR), during which it is initialized.

After its initialization, the transponder TR transmits a presence signal PS, which is generated by phase modulation and backscattering of the carrier signal TS transmitted by the base station BS, when a parameter stored in the memory SP is set to a release value. Otherwise, the transponder does not transmit a presence signal PS.

FIG. 2 shows a diagram of the time course of a modulation signal MS, generated in the transponder, for modulating the carrier signal TS transmitted by the base station BS. The modulation signal MS has a period duration TP, an on duration T1, and an off duration TP−T1. It is possible to calculate in a simple way a frequency and a pulse duty factor of the modulation signal MS from the aforesaid durations TP and T1. The modulation signal MS represents a so-called subcarrier.

To set the durations T1 and TP, the memory SP contains parameters in the form of counter values, which are used for comparison with a counter reading of the counter ZL. The counter ZL is incremented with a clock signal CLK of the oscillator OZ. The counter ZL is, for example, 8 bits long, so that it overruns after 256 clock cycles. The impedance control device IS, coupled to the memory SP and the counter ZL, compares the counter reading of the counter ZL with the stored counter values and in each case changes the state of the modulation signal MS, when the counter reading agrees with a counter value. The state of the modulation signal MS changes with a change in an input impedance ZE of the transponder TR, which causes a phase change and thereby a phase modulation of the backscattered signal or the presence signal PS. The impedance change occurs hereby in such a way that substantially no amplitude change of the backscattered signal received by the transponder occurs. This prevents notches from being produced in an RSSI circuit (not shown) of the transponder TR based on the generation of the presence signal PS by the transponder TR. Hence, the transponder TR remains ready to receive also during the transmission of the presence signal PS.

FIG. 3 shows a diagram of the time course of a presence signal PS transmitted by the transponder TR and a command CO transmitted by the base station. The transponder TR begins the transmission of the presence signal PS at time T2. After the base station BS has detected the presence signal PS, starting at time T3, it transmits a command CO to the transponder TR. The command is intended to cause the transponder TR to adjust the transmission of the presence signal PS. However, any other commands, for example, programming and/or read commands, are also possible.

The command CO comprises notches NO sequential over time. The durations between sequential notches hereby code the priorities of the bits to be transmitted. Based on the generation of the presence signal by using phase modulation, the transponder TR or RSSI circuit thereof is capable of detecting the notches and based on the time differences between them to decode a bit stream belonging to the command CO. At time T4, after the transponder has completely received the command CO, it ends the transmission of the presence signal PS.

The presented exemplary embodiment realizes an EAS method, which is simple and economical to implement, according to the tag-talks-first principle, which enables receipt of data by the transponder, even when the transponder is transmitting a presence signal.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for wireless data transmission, the method comprising the steps of:
providing a base station and a backscatter-based transponder, the base station and the backscatter-based transponder transmitting wirelessly between one another; and
generating a presence signal by a transmitting portion of the transponder as soon as said transponder enters a transmission range or response range of a carrier signal from said base station independent of data transmitted on said carrier signal by the base station,
wherein the data is transmitted by the base station via amplitude modulation including a succession of a plurality of field gaps between amplitude signals,
wherein the presence signal is generated by phase modulation and backscattering of said carrier signal that is transmitted by the base station, said presence signal having a substantially constant amplitude,
wherein a receiving portion of said transponder detects said data generated by said base station and detects said presence signal generated by said transmitting portion of said transponder,
wherein the transponder receives the data while the presence signal is being transmitted,
wherein said receiving portion of said transponder is configured to differentiate between the data from the base station and the presence signal generated in said transmitting portion of the transponder, and
wherein the transponder stops sending the presence signal when the transponder receives a command signal from said base station.

2. The method according to claim 1, wherein the transponder is provided with operating power exclusively by the carrier signal.

3. The method according to claim 2, wherein the transponder is initialized when the operating power is sufficient for supplying the transponder.

4. The method according to claim 1, wherein the presence signal is generated by modulation of the carrier signal with a subcarrier.

5. The method according to claim 1, wherein the presence signal contains a transponder identification.

6. The method according to claim 1, wherein a configuration command transmitted by the base station and/or a transponder-internal memory contains one or more parameters for setting the presence signal.

7. The method according to claim 6, wherein a frequency and/or a pulse duty factor of a modulation signal, with which the carrier signal is modulated, is set by at least one parameter.

8. The method according to claim 7, wherein the frequency and/or the pulse duty factor is derived from a transponder-internal oscillator clock.

9. The method according to claim 6, wherein the generation of the presence signal is released or suppressed by the at least one parameter.

10. The method according to claim 1, wherein the transponder ends the transmission of the presence signal, when a prescribable maximum time has elapsed and/or the transponder receives a command.

11. The method according to claim 1, wherein a frequency of the carrier signal is within the UHF frequency range.

12. A transponder comprising:
an antenna for receiving a carrier signal that is transmitted by a base station, the transponder receiving the carrier signal within a transmission range of the base station; and
a presence signal generation unit having a transmitting unit and a receiving unit wherein said transmitting unit generates a presence signal as soon as said transponder enters a transmission range or response range of a carrier signal from said base station by phase modulation and backscattering on the basis of the carrier signal transmitted by the base station, the presence signal having a substantially constant amplitude and the presence signal being generated independently of data transmitted by the base station, wherein said receiving unit of said transponder detects said data generated by said base station and detects said presence signal generated by said transmitting unit of said transponder, wherein the data is transmitted by the base station via amplitude modulation including a succession of a plurality of field gaps between amplitude signals, wherein the transponder receives the data while the presence signal is being transmitted, wherein said receiving unit of said transducer is configured to differentiate between the data from the base station and the presence signal generated in said transmitting unit of the transponder, and wherein the transponder stops sending the presence signal when the transponder receives a command signal from said base station.

* * * * *